(No Model.)
J. HANKIN.
BELT CLAMPING DEVICE.
No. 600,869. Patented Mar. 22, 1898.
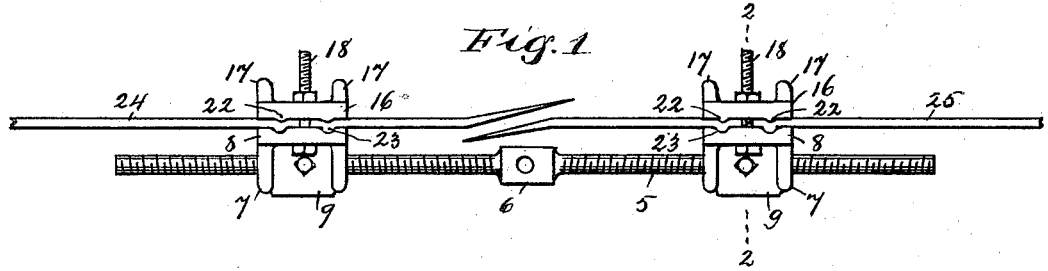
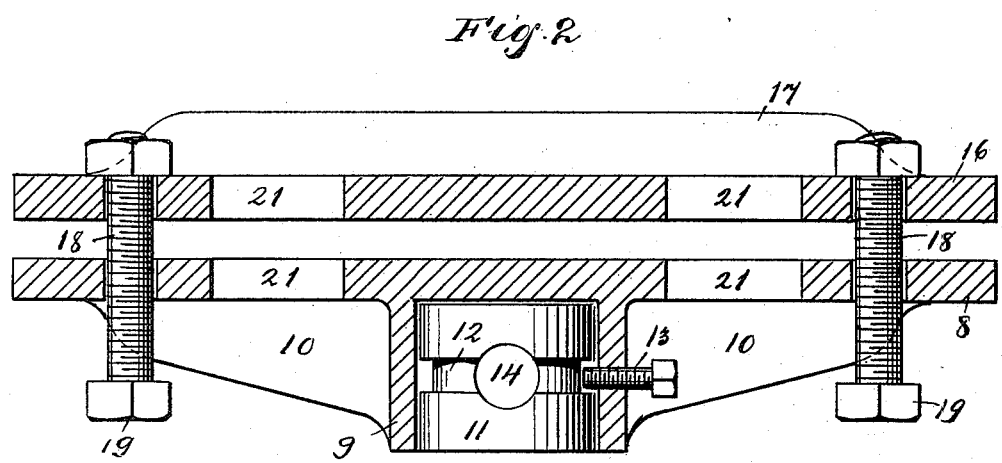
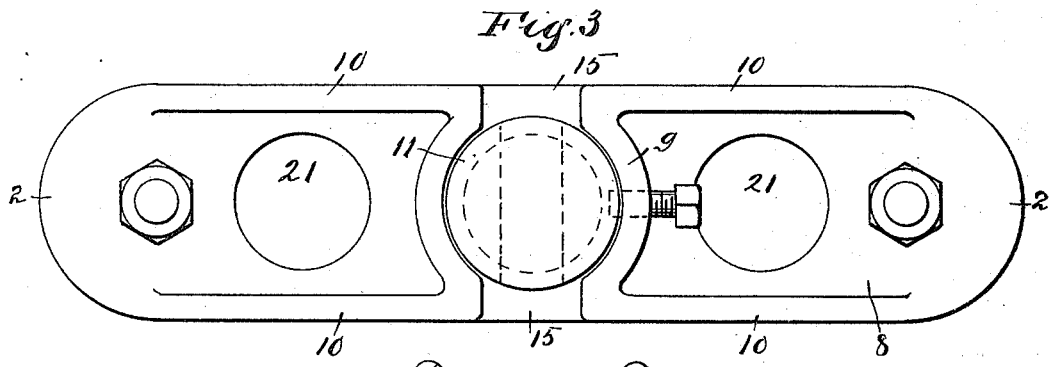
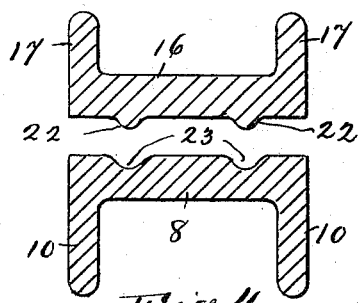
WITNESSES
INVENTOR
John Hankin.
BY
Edgar Tate & Co
ATTORNEYS.

UNITED STATES PATENT OFFICE.

JOHN HANKIN, OF NEW YORK, N. Y.

BELT-CLAMPING DEVICE.

SPECIFICATION forming part of Letters Patent No. 600,869, dated March 22, 1898.

Application filed February 10, 1897. Serial No. 622,785. (No model.)

*To all whom it may concern:*

Be it known that I, JOHN HANKIN, a citizen of the United States, residing at New York, in the county of New York and State of New York, have invented certain new and useful Improvements in Belt-Clamping Devices, of which the following is a full and complete specification, such as will enable those skilled in the art to which it appertains to make and use the same.

This invention relates to belt-tightening devices or clamps; and the object thereof is to provide improved means for taking up the slack in a pulley or power belt.

The invention is fully disclosed in the following specification, of which the accompanying drawings form a part, in which—

Figure 1 is a side view of my improved belt-clamp, showing the ends of a belt connected therewith; Fig. 2, a cross-section of one of the clamps which I employ, taken on the line 2 2 of Fig. 1 and 2 2 of Fig. 3; Fig. 3, a bottom plan view of the clamp shown in Fig. 2, and Fig. 4 a cross-section thereof. Figs. 2, 3, and 4 are on a scale much larger than that shown in Fig. 1.

In the drawings forming part of this specification the separate parts of my improvement are designated by the same numerals of reference in each of the views, and in the practice of my invention I provide a clamp which comprises a shaft or rod 5, which is provided with a central hub 6, and the separate ends of which are each provided with screw-threads which run in opposite directions, and mounted on each end of this shaft or rod 5 is a clamp 7, which is of the form and construction shown in detail in Figs. 2, 3, and 4, inclusive.

In constructing the clamps 7 I provide a base-plate 8, which is provided centrally of its lower side with a tubular downwardly-directed extension 9 and longitudinal side braces 10, and mounted in the tubular extension 9 is a cylindrical bearing 11, provided with an annular groove 12, which is adapted to receive the end of a set-screw 13, which is passed through the side of the tubular extension 9, and the cylindrical bearing 11 is provided with a transverse bore or passage 14, through which the end of the rod or shaft 5 is passed, and the downwardly-directed extension or bearing 9 is open at its opposite sides, as shown at 15 in Fig. 3, and the shaft or rod 5 or the end thereof is passed through these side openings at 15 and through the cylindrical bearing 11, as will be readily understood. Each of the clamps is also provided with a top plate 16, having longitudinal side ribs 17, by which it is braced and strengthened, and passing vertically through the ends of the top and bottom plates are bolts 18, provided with nuts or burs 19, by which said plates may be securely clamped together, and each of said plates is also provided at each side of the center thereof with openings 21.

The top plate 16 of the clamps is provided with longitudinal ribs 22, which are formed on the bottom thereof, and the bottom plates 8 with corresponding longitudinal grooves 23, into which said ribs enter when the top and bottom plates are clamped together.

In Fig. 1 I have shown the method of the operation of this device, and at 24 and 25 I have shown the separate ends of a power belt or band, and, as hereinbefore stated, this device is adapted to be used in connection with a power belt or band mounted on pulleys or wheels for the purpose of taking up the slack therein without removing the belt or band from said pulleys or wheels, and in this operation the clamps 7 are connected with the belt or band at any desired point between the pulleys or wheels, and the belt is then divided or cut between the clamps, and then by turning the rod or shaft 5 by means of a lever passed through the hub 6 the clamps may be drawn together, and in this operation the ends of the belt or band will also be drawn together and may be again fastened or coupled in any desired manner.

This device is simple in construction and operation and is perfectly adapted to accomplish the result for which it is intended, and it will be apparent that changes in and modifications of the form of the clamps herein shown and described may be made without departing from the spirit of my invention or sacrificing its advantages.

Having fully described my invention, I claim as new and desire to secure by Letters Patent—

1. The herein-described belt-tightening device, consisting of two clamps which are adapted to be connected with a belt, and through which are passed a rod or shaft, the separate ends of which are screw-threaded, said threads being turned in opposite directions, and said clamps being adapted to be drawn together or separated by turning said shaft or rod, and said clamps being provided with pivoted bearings through which said rod or shaft passes, substantially as shown and described.

2. The herein-described belt-tightening device, consisting of two clamps which are adapted to be connected with a belt, and through which are passed a rod or shaft, the separate ends of which are screw-threaded, said threads being turned in opposite directions, and said clamps being adapted to be drawn together or separated by turning said shaft or rod, and said clamps being provided with pivoted bearings through which said rod or shaft passes, and said clamps being each provided with a top plate which is connected with the bottom portion thereof, by means of bolts which pass therethrough, substantially as shown and described.

3. The herein-described belt-tightening device, consisting of two clamps, which are adapted to be connected with a belt, a single rod or shaft connecting said clamps, each clamp being mounted upon said rod or shaft, so that it is laterally or pivotally movable, whereby the belt may be stretched to independent degrees on each side thereof by the single movement of the rod or shaft, substantially as shown and described.

In testimony that I claim the foregoing as my invention I have signed my name, in presence of the subscribing witnesses, this 9th day of February, 1897.

JOHN HANKIN.

Witnesses:
C. GERST,
L. M. MULLER.